Patented May 9, 1933

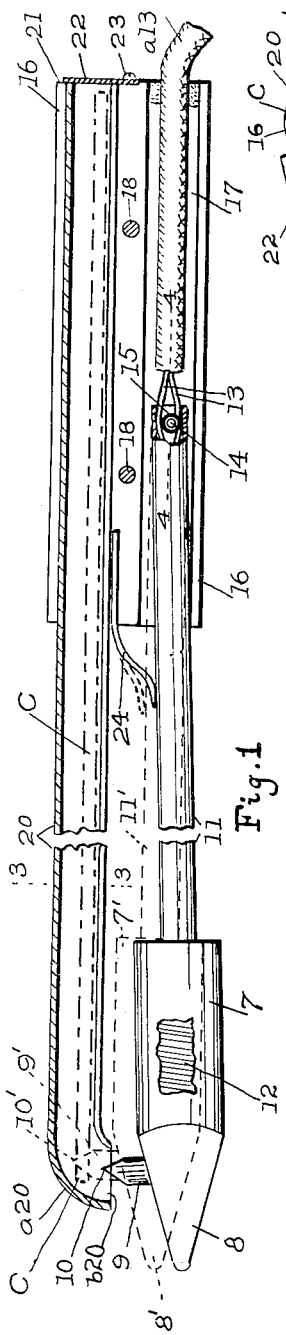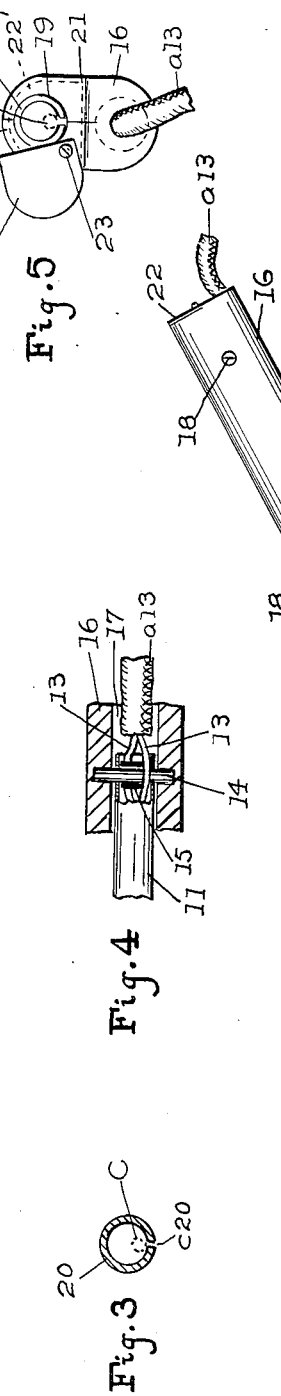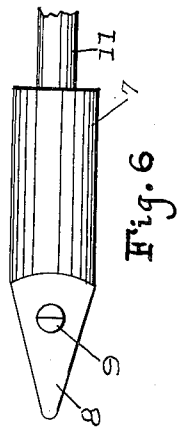

1,908,514

UNITED STATES PATENT OFFICE

ALLEN LEE JOHNS, SR., OF ANACORTES, WASHINGTON, ASSIGNOR OF ONE-HALF TO GLENN O. HUTTON, OF ANACORTES, WASHINGTON

MAGAZINE SOLDERING DEVICE

Application filed July 1, 1932. Serial No. 620,367.

My invention relates to improvements in magazine soldering irons, more especially those which are electrically heated, and has for an object to provide a magazine soldering iron in which a supply of unmelted solder is retained for exposure, automatically, to melting heat during soldering operations and automatically protected from the melting heat when the soldering iron is not being used.

Another object of my improvement is to provide the soldering iron with a horn projected from the side thereof not ordinarily applied to the work as a means of quickly melting solder bearing thereon.

Other objects of my improvement will appear as the description proceeds.

I attain these and other objects of my invention with a device one form of which is illustrated in the accompanying sheet of drawing forming a part of this specification in which Figure 1 is a side elevation view of the soldering device in section on a longitudinal, medial vertical plane shown as having a portion thereof broken away; Fig. 2 is a smaller scale drawing of the device showing a side elevation thereof when in a characteristic operative position bearing on the work; Fig. 3 is a segregated cross section of the magazine tube on the line 3—3 of Fig. 1; Fig. 4 is a fragmentary plan view of Fig. 1 in section on the line 4—4 of Fig. 1; Fig. 5 is a rear end elevation of Fig. 1, and Fig. 6 is a plan view of the soldering iron segregated.

Similar characters refer to similar parts throughout the several views. Certain parts are broken away to show other parts hidden thereby.

With particular reference to the designated parts: The soldering iron 7, being of course made of copper, has the pyramidal working end 8, the horn 9 integral therewith and projected from near the base of the top plane of the said working end, the beveled outer end 10 of the horn, the tubular shank 11 of the soldering iron, the electrical heating element 12 within a chamber of the soldering iron, and the electrical wires 13, 13, comprising cable a13, connecting the said terminals of the element 12 with a source of electricity not shown.

An insulating handle 16 is preferably oval in shape of cross section and for construction convenience is made in two parts joined on a vertical, medial longitudinal plane and fastened together with screws 18, 18.

Longitudinally through handle 16 are two holes the lower 17 being oval in cross section and the upper 19 being circular in cross section. In the front end of the lower hole 17 is inserted the outer end of tubular shank 11 to near the middle of the handle 16 where it is pivoted on horizontal transverse pin 14 extended through a hole near the end of the tubular shank 11 and into holes in handle 16 preferably not extended entirely through the same. Within the tubular shank 11 the pin 14 is covered by insulating sleeve 15 to prevent the wires 13, 13 on each side thereof from contacting therewith. Hole 17 in handle 16 is as wide as the tubular shank 11 in the horizontal and wider than the same in the vertical allowing the tubular shank and iron 7 thereon freedom for short vertical oscillations to move from the solid-line positions at 11, 7 and 8 to the dotted positions at 11', 7' and 8', while the horn moves from the solid-line position 9 to the dotted position at 9', its sharpened end moving from the solid-line position 10 to the dotted position at 10', in Fig. 1. One end of leaf spring 24 is fastened in handle 16 and its other end bears on tubular shank 11 and by its reactions tends to return the iron and its shank from their described dotted positions in Fig. 1 to their solid-line positions therein.

The rear end of handle 16 is recessed at 21 and magazine cover 22 is pivoted at 23 to oscillate in the recess to cover and uncover the rear end of the hole 19 through the handle. In Fig. 5 the cover is shown in solid lines at 22, its open position, and in dotted lines at 22' its closed position; while in Figs. 1 and 2 it is shown as being closed in solid lines.

Magazine tube 20, preferably unwelded and having a thin opening c20 through its bottom, is extended through hole 19 in the upper part of handle 16 with its rear end about even with the surface of recess 21. The tube fits snugly in the handle being clamped therein by the screws 18. The cover 22 closes the rear end of the magazine tube and is pivoted on screw 23 at one corner thereof to tend to remain closed by gravity when the device is in operative position as shown in Fig. 2.

The front end of the magazine tube 20 is bent downward at a20 providing opening b20 therein disposed opposite the top plane of the end 8 of iron 7 and registering with the horn 9. The relative location of the opening b20 and the horn 9 provides that the sharp end 10 of the horn is within the opening b20 but below the line of the inner surface of the bottom wall of the tube 20 when the soldering iron 7 is farthest removed from the tube, as shown in solid lines in Fig. 1; but the horn 9 is well up in the end of the tube with its sharp end 10 near the top wall thereof when the soldering iron 7 is in its oscillative position nearest the tube 20, as shown in dotted lines in Fig. 1 with the horn at 9' and the end thereof at 10'.

Within the magazine tube 20 is placed the stick of wire solder C shown in broken lines in Fig. 1 and also in Figs. 3 and 5. When the device is in the characteristic operative position shown in Fig. 2 the solder stick will bear against the curved lower end a20 of the tube as shown in Fig. 1. The solder stick assumes this place in the front end of the tube by gravity during the usual operative movements of the device, but because of other positions which the device may occupy when out of use, and even when in use, the cover 22 is found to be useful in preventing the solder from leaving the tube through its rear end.

The peep hole 25 is made through a wall of the lower end of the tube 20, disposed as shown in Fig. 2, where the solder stick may be seen through it when the soldering iron is withdrawn from the tube under the reaction of the spring 24 or by gravity in combination with the spring; and the peep hole is opposite the horn 9 when the iron 7 is in its position nearest to the tube 20.

*In operation.*—Assume that electric wires 13, 13 are connected with a source of electricity which through element 12 has raised the temperature of the soldering iron 7 to the soldering point; and that the stick of solder C is in the magazine tube 20 with its lower end bearing on the curved wall a20 of the tube, as seen through the peep hole 25.

Apply the end 8 of the soldering iron to the work D, as shown in Fig. 2, when the operative pressure from the operative's hand, not shown, on handle 16 will cause the iron to approach the tube, against the action of gravity and the reaction of spring 24, forcing the hot, sharp end 10 of the horn 9 against the solder C melting the same. The melted solder quickly flows downward around the horn 9 and on to and over the top plane of the end 8; thence over the side planes thereof from which it reaches the bottom plane, over which it spreads, if the latter is being pressed flatwise on the work; but when the iron is held as in Fig. 2, the melted solder flow converges at the point of the iron where it is supplied in sufficient quantity to provide for the rapid use of the iron in applying solder to the work.

In practice it has been found that the horn 9 comes to be of the highest temperature of any part of the tapering iron end when the latter is being pressed flatwise on the work.

When the iron is being used while in a position similar to that of Fig. 2 the solder stick C will move downward in the tube and continue to contact with the horn 9 to maintain a solder supply and continue the flow of melted solder downward over the horn and iron to the point 8 thereof more rapidly than it ordinarily is needed in the soldering operation. When the said flow is too rapid it may be reduced by simply moving the lower end of the tube 20 upward and allowing the iron 7 to move farther away from the same. When the position in which the device is being held during soldering operation is such that the solder stick C can not move by gravity against the horn 9 an occasional change in its position to cause this gravity feeding-down movement of the solder stick is resorted to.

Additional supplies of the solder sticks may be placed in the magazine tube 20 at any time through the upper end thereof by opening cover 22 thereover. By using solder wire tubes filled with flux, common in the art, soldering with this device may proceed with one hand only of the operative devoted to holding and moving the soldering device, leaving the other hand of the operative entirely free for use in connection with the work. Or, stated in another way, this soldering device provides the operative with another hand when used to replace the ordinary soldering iron.

Those familiar with the art may have some concern as to the suitability of common metals for the magazine tube 20. That is, in time the lower end of the tube may be plugged with solder or etched by the corrosive fumes from fluxes, used in the work of soldering, it might be believed. However, in practice it has been found that a sheet iron magazine tube will give a reasonable length of service before being eaten away by the acid fumes, meanwhile the solder does not adhere to it. But aluminum has given the best service when used in the tube 20, neither becoming clogged by solder nor much etched by the acid fumes.

The reduction to practice above described includes all of the essential details useful in a device of this kind. Some of these details may be considerably varied and yet the usefulness of the device retained. A considerable simplification may be attained by omitting the spring 24 and also the pivoted connection on pin 14 may be dispensed with and yet have a soldering device far more useful than the ordinary soldering iron for certain particular purposes. Furthermore, it has been found that by adding the horn 9 to an ordinary soldering iron, without further improvement, it is much improved for melting solder by applying the same to the horn rather than to the body of the iron as usual.

It is, therefore, desired to have these and other similar variations and changes included within the purview of my invention.

Having thus disclosed my invention, what I claim as new therein and desire to secure by Letters Patent is,—

1. A soldering device including a soldering device handle, a soldering copper, a soldering copper shank one end thereof being attached to one end of the soldering copper the other end thereof being pivoted to the soldering device handle for limited oscillation, a solder magazine tube adapted for the free movement of solder therethrough attached to the said device handle having an opening therethrough adjacent the soldering copper, and a horn attached to the soldering copper disposed to be extended through the said magazine tube opening by the approach of the soldering copper oscillating on the said pivot.

2. A soldering device including a soldering device handle, a soldering copper, a soldering copper shank one end thereof being attached to one end of the soldering copper the other end thereof being pivoted to the said device handle for limited oscillation, a solder magazine tube adapted for the free movement of solder therethrough attached to the said device handle having an opening therein disposed adjacent the soldering copper, a horn attached to the soldering copper disposed to be extended through the said magazine tube opening by the approach of the soldering copper oscillating on the said pivot, and a spring mounted to react between the magazine tube and the soldering copper shank to withdraw the said horn from the said tube opening by oscillating the shank on the said pivot.

3. A soldering device including a soldering copper, a handle, a shank one end thereof being fastened to the said soldering copper and the other end thereof being pivotally connected with the said handle for oscillation thereon, and a solder magazine tube adapted for the free movement of solder therethrough one end thereof being fastened to the said handle and the other end having an opening through its walls disposed adjacent the said soldering copper at a distance therefrom being varied by the oscillation of the soldering copper on the said pivoted shank thereof.

4. A soldering device, including a soldering copper, a handle, a shank one end thereof being fastened to the said soldering copper and the other end thereof being pivotally connected with the said handle for oscillation thereon, a solder magazine tube adapted for the free movement of solder therethrough one end thereof being fastened to the said handle and the other end having an opening through its walls disposed adjacent the said soldering copper at a distance therefrom being varied by the oscillation of the soldering copper on the said pivoted shank thereof, and a spring fastened for reaction between the said soldering magazine tube and the said shank tending to withdraw the said soldering copper from the said magazine tube.

ALLEN LEE JOHNS, Sr.